Figure 1:
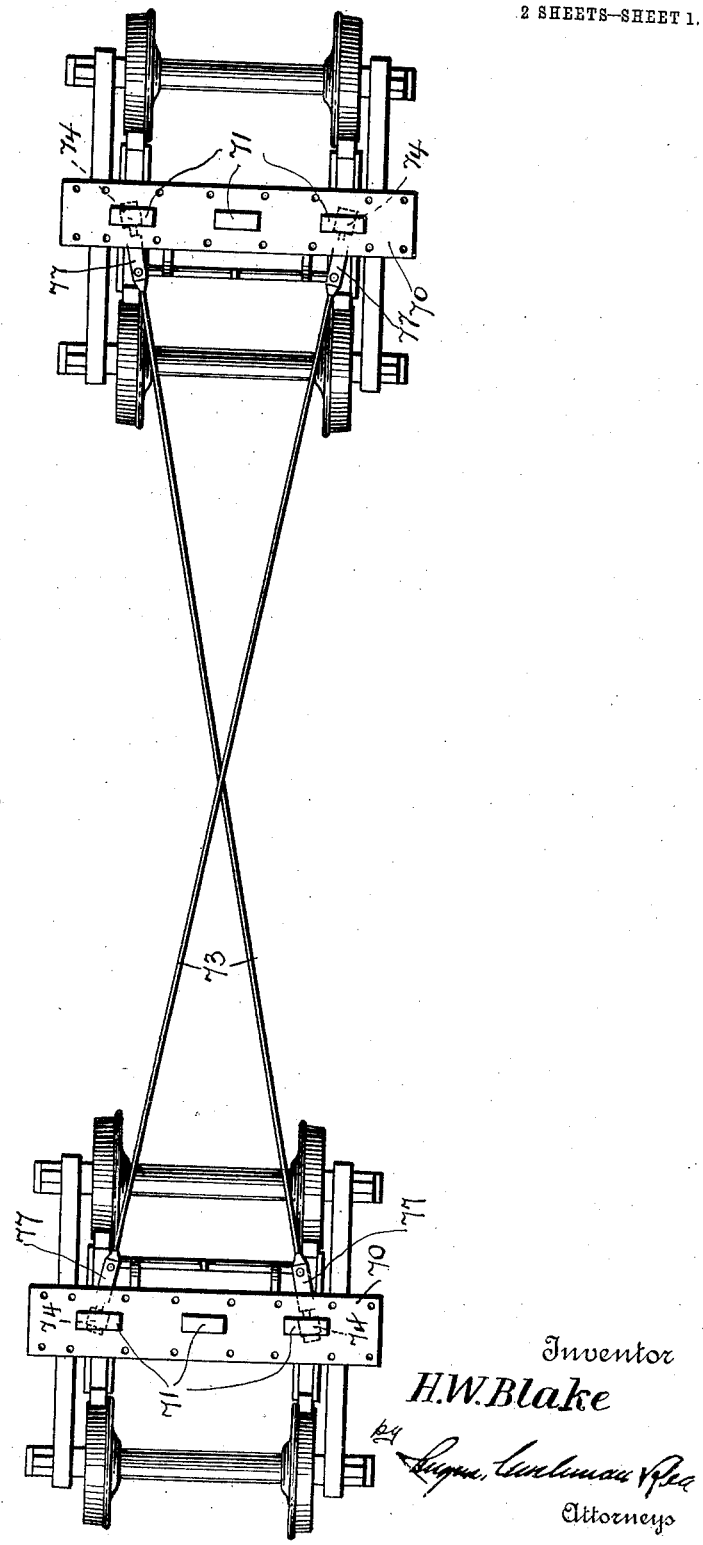

H. W. BLAKE.
EQUALIZING MECHANISM FOR CARS.
APPLICATION FILED NOV. 23, 1909.

976,845.

Patented Nov. 29, 1910.

2 SHEETS—SHEET 1.

Witnesses
J. G. Hinkel
Horace G. Deitz

Inventor
H. W. Blake
by
Attorneys

H. W. BLAKE.
EQUALIZING MECHANISM FOR CARS.
APPLICATION FILED NOV. 23, 1909.
976,845.
Patented Nov. 29, 1910.
2 SHEETS—SHEET 2.
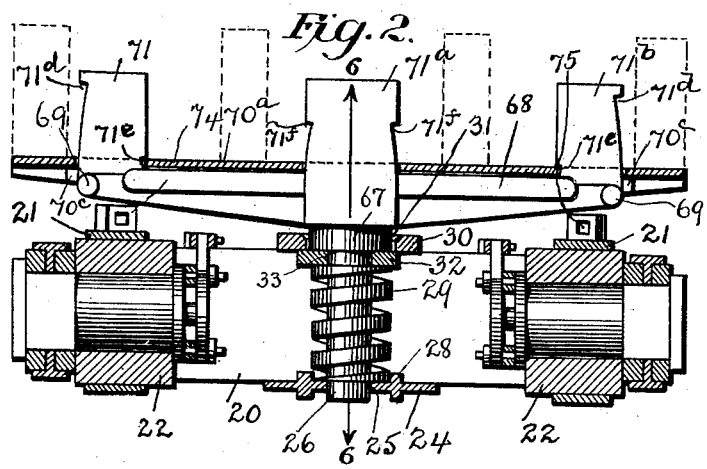
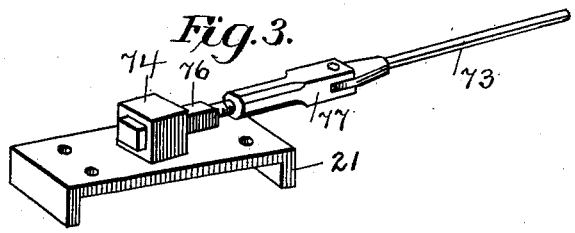
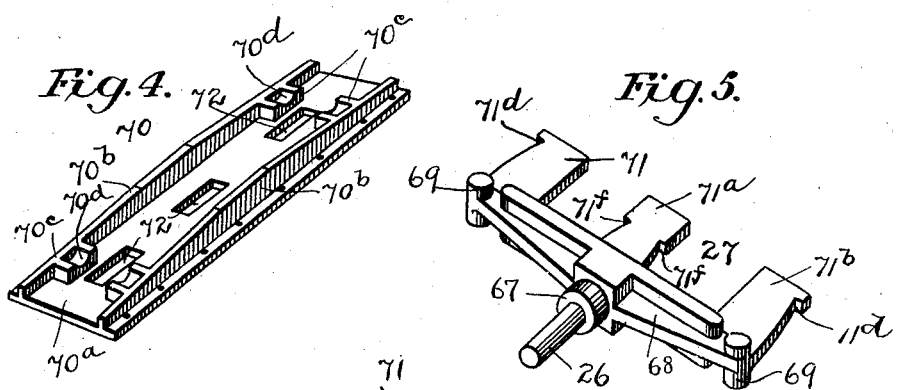
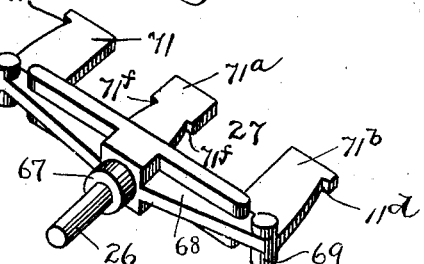
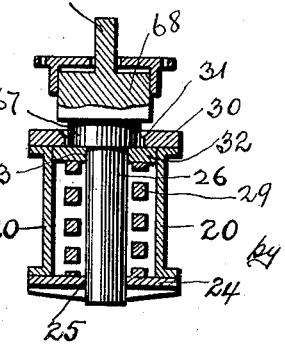
Witnesses
J. G. Hinkel
Horace G. Seitz
Inventor
H. W. Blake
by his Attorneys

UNITED STATES PATENT OFFICE.

HENRY W. BLAKE, OF BALL GROUND, GEORGIA.

EQUALIZING MECHANISM FOR CARS.

976,845.                    Specification of Letters Patent.     Patented Nov. 29, 1910.

Application filed November 23, 1909. Serial No. 529,651.

*To all whom it may concern:*

Be it known that I, HENRY W. BLAKE, a citizen of the United States, residing at Ball Ground, in the county of Cherokee and State of Georgia, have invented new and useful Improvements in Equalizing Mechanism for Cars, of which the following is a specification.

My invention relates to improvements in equalizing mechanism for cars, and has particular relation to mechanism for mounting the car body on the trucks and connecting the trucks together in such manner as to provide co-action therebetween to produce uniform movements.

In supporting a car body on the trucks, it is the general practice to locate the points of support on opposite sides of the center of the truck with the result that there is a tendency of a truck to be raised on one side or the other when the car is rounding a curve owing to the fact that the pressure on both sides of the truck is not equalized at this time, the result being that excess pressure is placed on the outer rail of the curve and a tendency to disturb the position of this rail by a gradual sinking thereof is present. Another disadvantage of this construction lies in the fact that by its use the truck wheels receive an excessive frictional effect to produce excessive wear, and a tendency to "slow up" the running of the truck during such curve-rounding movement of the car. In avoiding these objections I eliminate the forming of an actual supporting contact of the car body and truck at any point except at the center of the truck and at the same time provide an extended support for the car body by the use of a particular form of king-bolt which connects the car body with the truck. In connection with this form of support, I provide connecting members between the trucks which serve to equalize the movements of the two trucks in a manner to cause them to travel around the curve with a relative freedom from excessive frictional engagement of the flange and rail, the combined arrangement of center support for the car body and the equalizing connection of the trucks producing what may be termed a reversing resistance to the normal tendency of the wheels to climb the track on the outer sides of the curves, and lessening the liability of the track spreading under the pressure provided by the moving car body.

The principal objects of my invention are therefore to provide a structure in which the trucks are free to move on a vertical pivot without being affected by rocking movements of the car body, and at the same time to restrain the freedom of such movement by the action of one truck upon the other.

A further object is to provide an equalizing structure which may be readily placed in position, and which will operate with certainty and without excessive liability of becoming broken.

A further object is to provide an equalizing structure in which the connection of the equalizing bars with the truck are located at points approximately midway of the distance between the wheels and adjacent to the side frames of the truck.

A further object is to provide a structure which is simple and efficient in operation, durable in construction, readily placed in position, and which is readily renewable in case of breakage.

To these and other ends, the nature of which will be readily understood as the invention is hereinafter disclosed, said invention consists in the improved construction and combination of parts hereinafter fully described, illustrated in the accompanying drawings, and particularly pointed out in the appended claims.

In the accompanying drawings, in which similar reference characters indicate similar parts in each of the views, Figure 1 is a diagrammatic plan view of two trucks connected by the equalizing mechanism, and illustrating the truck parts which are in actual contact with the car body. Fig. 2 is a vertical transverse sectional view of a truck frame and illustrating the manner in which the car body is supported on a truck. Fig. 3 is an enlarged sectional view taken longitudinally of one of the ends of an equalizing bar and showing one of its connections with the truck. Figs. 4 and 5 are detail views respectively of the bolster plate and king-bolt. Fig. 6 is a section taken on the line 6—6 of Fig. 2.

The truck illustrated herein is of the type shown in my companion application filed November 23, 1909, Ser. No. 529,649, and being composed of the bolster, side frames, and wheels, the specific construction and relation of these parts not being particularly described herein, the element of the truck in connection with which the present invention more particularly relates being the bolster which will be described more in detail.

The bolster comprises two spaced-apart parallel flanged plates or channel bars 20 of a length substantially equal to the distance between the side frames, and of a suitable width, said plates being secured together at their ends by clamps 21 extending across the flanges at the top and bottom of the plates, the space between the plates at each end being filled by a block 22 to which said frames are connected. This construction of bolster provides an elongated space extending vertically between the two plates, within which space is received the operating parts of the truck including the support for the car body, the latter being located midway of the length of the bolster, and being provided with the particular elements now to be described.

24 designates a plate bolted to the underface of the plates 20 substantially midway of the length of said plates 20, the plate 24 having an opening 25 for the passage of the stud 26 of a king-bolt 27. The plate 24 is also provided on its upper face with crossbars or ribs 28 extending between the plates 20, said ribs forming retaining or positioning members for the lower portion of a spring 29. On the upper face of the plates 20 a plate 30, complemental to and in alinement with the plate 24, is secured, said plate 30 having an opening 31 of larger diameter than the opening 25. Intermediate the plate 30 and the upper end of the spring 29, I provide a washer 32 having an opening 33 through which the stud 26 passes, said washer and spring forming a yielding support for the king-bolt 27.

The king-bolt 27 is preferably formed as shown in Fig. 5 of the drawings. The stud portion 26 thereof is adapted to extend through the washer 32 and spring 29, the upper end of said stud being expanded in the form of a collar 67, the lower face of which rests on the washer 32, said collar being of a size to pass through the opening 31. The upper portion of the bolt 27 is in the form of an elongated bar 68, the ends of which are formed with circular projections or trunnions 69 adapted to be received within the recesses formed on the underside of the bolster plate 70. The bolt 27 is also provided with a plurality of upwardly extending projections 71, 71$^a$ and 71$^b$ adapted to extend through openings 72 formed in the plate 70 and passed between the beams of the car body.

The plate 70 is formed, as shown in Fig. 4, in the form of a plate portion 70$^a$, of a length sufficient to extend substantially across the bottom of the car. Projecting downwardly from the plate 70$^a$ are two flanges 70$^b$, extending longitudinally of the plate, and of approximately equal length therewith, said flanges being spaced from the side edges of the plate a distance sufficient to provide for suitable bolt holes by means of which the plate is secured to the car body. The plate 70$^a$ is provided with a plurality of elongated openings 72 properly positioned to permit of the passage therethrough of the projections of the king-bolt; said plate is also provided with a plurality of projections 70$^c$ located on opposite sides of the plane of the openings 72, each of said projections being recessed, the projections and recesses 70$^d$ therein being positioned to permit of the passage thereinto of the projections 69 of the king-bolt.

By this construction it will be seen that the king bolt 27 is supported solely centrally of the truck, the support being yieldable vertically, the stud extending through the spring 29, while the car body being secured directly to the bolster plate 70 is provided with an extended supporting contact with the king-bolt at points spaced widely apart and located on opposite sides of the vertical plane of the stud 26. Inasmuch as the plate 70 is not secured to the king-bolt, the connection being solely by the passing of the projections through the openings 72, the rocking of the car body will not disengage the connection, the projections 69 serving to resist the rocking movement without placing any strain upon the ends of the bolster other than that produced by the pressure at the center of the bolster, there being no contact of the car body and the bolster at the ends of the king-bolt; in other words, the structure of the bolster-plate and king-bolt is such that these parts coöperate to provide a body-sway counteracting element. The construction therefore provides for an equal distribution of weight throughout the entire truck, whether the car body be in rocking motion or simply stationary, and it is due to this fact that the truck, in rounding curves, does not apply an abnormal downward pressure on the outer rail, both the inner and outer rails bearing an equal amount of load at this time. As this central mounting of the car body provides no restraining effect on the truck against a tendency of pivotal movement thereof, (the stud 26 not being secured in place in such manner as would prevent a free pivotal relative movement between the truck and king bolt), I provide restraining means to limit the pivotal movement in the form of equalizing bars which connect the two trucks of the car, and which act to mutually affect the trucks, properly positioning them relative to the tracks, regardless of whether the trucks are rounding a curve or moving on a straight portion of the trackway.

The equalizing bars, designated as 73 extend diagonally from one end of the bolster of one truck to the opposite end of the bolster of the other truck, as shown in Fig. 1, the rods crossing approximately centrally of the space between the two trucks. To provide for a securing of the rods to the bolster, I provide the latter with vertically extending projecting portions 74 at each end of the bolster, and midway of its width, said projections each having an angular opening 75 extending therethrough, the axis of the opening extending in approximate alinement with the rod or bar 73 when the latter is within the position it occupies when the two trucks are running over a straight portion of the trackway.

76 designates a bolt or equivalent structure which is adapted to extend through the opening 75, said bolt for a portion of its length being of similar configuration in cross-section to the configuration of the opening 75, the free end of the bolt being screw-threaded and adapted to pass into a half turn-buckle 77 carried by the bar 73, said turn-buckle having a pivotal connection with the bar to permit of a changing of angularity of the two bars while the trucks are rounding a curve without tending to bend or break the bolt connection located within the opening 75. This form of connecting the bars with the truck permits of an accurate adjustment of the length of the bars as a whole to insure a proper parallelism between the trucks when they are located on the straight portion of the trackway.

The particular location of the ends of the bars 73 at a point in transverse alinement with the stud 26 when the parts are assembled, provides for a swinging movement of the truck from a point intermediate the wheels and consequently causing the truck as a whole to be carried around the curve, thereby eliminating to a great extent the tendency of the front wheels to climb, and at the same time the absence of the car body pressure at any point excepting centrally of the truck, reduces the pressure which would be applied to the inner face of the outer rail when the truck is rounding a curve, thereby reducing friction of the wheels and track, permitting the truck to run with greater freedom, nullifying a reduction of speed to a greater extent, and increasing the life of the rails and trackway by reason of large reduction in the relative wear of the wheels and rails.

For the purpose of providing for the swinging and rocking of the car body when rounding curves, the king bolt has the projections 71, 71$^a$ and 71$^b$ of particular form, the form being best illustrated in Fig. 2 of the drawings. As shown in this figure, each of the projections 71 and 71$^b$ has its outer edge formed on an arc of which the opposite projection 69 is the center, this arc being continued to a point adjacent the top of the projection, the remaining distance to the top of the projection being extended outwardly as shown, this form providing a notch 71$^d$ on the outer edge of each of said projections. Said projections 71 and 71$^b$ are also provided with notches 71$^e$ on the opposite edge from the notches 71$^b$, the notches 71$^e$ being located at the bottom of these projections. The projection 71$^a$ also has notches on its opposite edges, but these notches have their upper walls on a line extending from the similar wall of the notches 71$^d$, which line would correspond to the top surface of the plate 70 if the latter be rocked on either projection 69; for instance, if the plate 70 were rocked on the projection 69, shown at the right of Fig. 2, the opposite end of said plate would rise until the wall at the outer end of the opening 72 would contact with the upper wall of the notch 71$^d$ of projection 71, at which time the upper surface of the plate 70 adjacent the central opening 72 would contact with the upper wall of the notch 71$^f$ on the left hand edge of the projection 71$^a$, while that portion of the plate adjacent the notch 71$^e$ of projection 71$^b$ would contact with the other wall of said notch 71$^e$, this construction permitting a free pivotal movement of the plate, with the projection 69 at the right of Fig. 2 as a center, until the upper surface of said plate makes contact with the other wall of the several notches referred to. Obviously, a similar effect will be produced if the pivotal movement be on the projections 69 at the left of said figure, excepting that the pivotal movement provides contact of the plate with the wall of the opposite notches.

By this construction, it will be seen that while the car is running on a straight track, the plate 70 will rest on the top of the king bolt, the projections 69 being in contact with the walls of the recesses 70$^d$, thereby placing the weight of the car centrally of the bolster; when, however, the car is rounding a curve, the projections at one or the other end of the king bolt will form the immediate supporting portion, depending on which direction the car is caused to tilt, with the result that the immediate support is shifted from the center to a point spaced from such center.

It is to be understood that wherever found necessary cotter pins will be made use of for the purpose of retaining pins and other removable parts in position and against separation. Furthermore, it is to be understood that, where necessary, parts will be riveted together to retain them in permanent engagement.

Having thus described my invention what I claim as new is:

1. As a means for equalizing the load weight on trucks, in combination, a pair of trucks, and a car-body seated thereon, the operative connection of car body and each truck being located solely at the center of the truck, said connection embodying two elements complementally formed to provide a shifting of the point of support of the car-body without changing the location of the connection with respect to the center of the truck.

2. As a means for equalizing the load weight on trucks, in combination, a pair of trucks, and a car-body seated thereon, the operative connection of car-body and each truck being located solely at the center of the truck, said operative connection comprising a king-bolt carried by the truck and a complemental member carried by the car-body, said bolt being held against pivotal movement in a horizontal plane relative to the car body.

3. The combination with a car-body, and a pair of trucks, of a king-bolt pivotally mounted at the center of the truck, said bolt having a head elongated laterally, and a bolster plate secured to the car-body and adapted to position the bolt relative to said body, said plate preventing relative pivotal movements of car-body and bolt in a horizontal plane.

4. The combination with a car-body and a pair of trucks, of a king-bolt pivotally mounted at the center of the truck, said bolt having a head elongated laterally, and a bolster plate secured to the car-body and adapted to position the bolt relative to said plate, said plate preventing relative pivotal movements of car-body and bolt in a horizontal plane, the connection of truck and plate through the bolt permitting a limited rocking movement laterally of the car-body relative to the truck.

5. The combination with a car-body and a pair of trucks, and a king-bolt pivotally mounted at the center of the truck, said bolt having a head elongated laterally, and a bolster plate secured to the car-body and adapted to position the bolt relative to said body, said plate preventing relative pivotal movement of car-body and bolt in a horizontal plane, and independent means for coupling the trucks to restrain them against a free and independent pivotal movement.

6. The combination with a car-body and a pair of trucks, of means for providing operative contact between the car-body and each truck solely at the center of the truck, whereby the truck will be free to move pivotally relative to the car-body, and independent means for coupling the trucks to provide a mutual restraint against free pivotal movement.

7. The combination with a pair of trucks, each having a bolster, of a pair of projections on the upper face of each bolster, and a pair of rods adjustably connecting the projections of the pair of trucks, said rods extending diagonally from one truck to the other, the pair of rods crossing each other intermediate the bolsters, said projections being located on a line extending transversely through the center of the truck, and intersecting a longitudinal line passing approximately through the wheels of the truck.

8. The combination with a pair of trucks each having a bolster, of a pair of perforated projections on the upper face of each bolster, the axis of each perforation extending diagonally with respect to the direction of length of the bolster, and a pair of rods adjustably connecting the projections of the pair of trucks, said rods having their directions of length extending in substantial alinement with the direction of the axes of the perforations.

9. The combination with a pair of trucks each having a bolster, of a pair of perforated projections on the upper face of each bolster, the axis of each perforation extending diagonally with respect to the direction of length of the bolster, a headed bolt mounted in each perforation, a screw-threaded coupling member mounted on each bolt, and a pair of rods connecting the coupling members and extending diagonally to cross approximately central of the distance between the trucks.

10. The combination with a car body and a pair of trucks, of a king bolt pivotally mounted at the center of each truck, said bolt having a head elongated laterally and provided with trunnions, and a bolster plate secured to the car body and normally supported on said trunnions, said trunnions forming independent supports for the plate during swaying or rocking movements of the car body.

11. The combination with a car body and a truck, of a king bolt pivotally mounted at the center of the truck and having a head elongated laterally, and a bolster plate secured to the car body, said bolt and bolster plate being complementally formed to provide a central support for the car body under normal conditions, and a shifting of the point of support during swaying or rocking movements of the car body.

12. The combination with a car body, and a truck therefor, of a cushion mounted centrally of the truck, a king-bolt resting upon and extending through said cushion and supported thereby, and means secured to the car body and coöperating with the king-bolt to provide therewith a body-sway counteracting element.

13. The combination with a car-body, and a truck therefor, of a spring cushion mounted centrally of the truck, a king-bolt resting upon and extending through said cushion and supported thereby, and means secured to the car body and coöperating with the king bolt to provide therewith a body-sway counteracting element.

14. The combination with a car body, and a truck therefor, of a cushion mounted centrally of the truck, a king-bolt resting upon and extending through said cushion and supported thereby, and a bolster plate secured to the car-body and coöperating with the king-bolt, to provide therewith a body-sway counteracting element.

15. The combination with a car body, and a truck therefor, of a cushion mounted centrally of the truck, a king bolt extending through said cushion and supported thereby, and a bolster plate secured to the car-body, said plate and bolt being complementally formed to prevent relative pivotal movement on a vertical axis and permitting a relative rocking movement on a horizontal axis.

16. The combination with a car-body, and a truck therefor, of a cushion mounted centrally of the truck, a king-bolt extending through said cushion and supported thereby, and a bolster plate secured to the car body, said plate and bolt being complementally formed to prevent relative pivotal movement on a vertical axis and permitting a relative rocking movement on a horizontal axis in directions transversely of the car body.

17. As a means for equalizing the load weight for trucks, in combination, a pair of trucks, and a car body seated thereon, the operative connection of car body and each truck being located solely at the center of the truck, said operative connection comprising a king-bolt and bolster plate connected respectively to the truck and the car-body, said parts coöperating to prevent a relative pivotal movement therebetween on a vertical axis.

18. In means for equalizing the load weight on trucks, the combination with a pair of trucks, and a car-body seated thereon, of a king-bolt seated centrally of each truck and having laterally extending portions to form an extended portion having a flexible connection with the car body, said connection preventing relative movement of the bolster and car body on a vertical axis and permitting a relative movement between these parts on a horizontal axis.

19. In equalizing mechanism for cars, the combination with a truck, and the car-body, of a king-bolt mounted pivotally at the center of the truck and having wings extending on opposite sides of its center, the free ends of each wing having an upwardly projecting portion coöperating with the carbody to prevent relative pivotal movement of the king-bolt and car-body on a vertical axis, the wings and car-body being relatively formed to permit relative movement of these parts on a horizontal axis.

20. In equalizing mechanism for cars, the combination with a truck, and the car-body, of a king-bolt mounted pivotally at the center of the truck and having wings extending on opposite sides of its center, the free ends of each wing having an upwardly projecting portion coöperating with the car-body to prevent relative pivotal movement of the king-bolt and car-body on a vertical axis, the wings and car-body being relatively formed to permit relative movement of these parts on a horizontal axis, the latter movements being on an axis located at either one of two points spaced from the line of vertical axis of the bolt.

21. The combination with a truck, and a car-body, of a king-bolt pivotally mounted at the center of the truck, and a bolster plate secured to the car-body, said bolt and plate having complemental means for preventing relative pivotal movement on a vertical axis and for permitting such relative movement on a horizontal axis.

22. The combination with a truck, and a car-body, of a king-bolt pivotally mounted at the center of the truck, and a bolster-plate secured to the car-body, said bolt and plate having complemental means for preventing relative pivotal movement on a vertical axis and for permitting such relative movement on a horizontal axis, said means being located at either one of two points positioned at equal distances on opposite sides of the line of vertical axis.

23. The combination with a truck, and a car-body, of a bolster plate secured to the car-body and a king-bolt pivotally mounted at the center of the truck, said bolster plate having spaced openings, and said king bolt having upwardly extending projections adapted to pass into and through said openings, said king-bolt and bolster plate having complemental means for permitting relative movement of the king-bolt and bolster plate on a horizontal axis.

24. The combination with a truck, and a car-body, of a king bolt pivotally mounted centrally of the truck, said bolt having wings extending laterally in opposite directions from the line of vertical axis of the bolt, and a bolster plate secured to the car-body said plate having spaced-apart openings, and also having bearing surfaces adjacent certain of said openings, said bolt having upwardly extending projections adapted to pass through said openings, and also having trunnions adapted to pass within said bearing surfaces during relative movements of the bolster plate and king-bolt on a horizontal axis.

25. The combination with a car body, and a truck therefor, of a king-bolt supported on the truck, and means secured to the car body and coöperating with the king-bolt to provide therewith a body-sway counteracting element.

In testimony whereof I have hereunto set my hand in presence of two subscribing witnesses.

HENRY W. BLAKE.

Witnesses:
BYRON THURMAN,
ARTHUR THURMAN.